(12) United States Patent
Gerard et al.

(10) Patent No.: US 9,905,872 B2
(45) Date of Patent: Feb. 27, 2018

(54) PROCESS FOR PREPARING AN ION-EXCHANGE COMPOSITE MATERIAL COMPRISING A SPECIFIC POLYMER MATRIX AND A FILLER CONSISTING OF ION-EXCHANGE PARTICLES

(71) Applicants: COMMISSARIAT À L'ÉNERGIE ATOMIQUE ET AUX ÉNERGIES ALTERNATIVES, Paris (FR); INSTITUT NATIONAL DES SCIENCES APPLIQUEES, Villeurbanne (FR); ARKEMA FRANCE, Colombes (FR)

(72) Inventors: Jean-François Gerard, Bron (FR); Véronique Bounor Legare, Lyons (FR); Sérigne Seck, Schiltigheim (FR); Pierrick Buvat, Monts (FR); Janick Bigarre, Tours (FR); Benoît Blondel, Chambray-les-Tours (FR); Jérôme Chauveau, Landepereuse (FR)

(73) Assignees: COMMISSARIAT À L'ÉNERGIE ATOMIQUE ET AUX ÉNERGIES ALTERNATIVES, Paris (FR); INSTITUT NATIONAL DES SCIENCES APPLIQUEES, Villeurbanne (FR); ARKEMA FRANCE, Colombes (FR)

( * ) Notice: Subject to any disclaimer, the term of this patent is extended or adjusted under 35 U.S.C. 154(b) by 147 days.

(21) Appl. No.: 14/785,005

(22) PCT Filed: Apr. 22, 2014

(86) PCT No.: PCT/EP2014/058116
§ 371 (c)(1),
(2) Date: Oct. 16, 2015

(87) PCT Pub. No.: WO2014/173885
PCT Pub. Date: Oct. 30, 2014

(65) Prior Publication Data
US 2016/0156055 A1 Jun. 2, 2016

(30) Foreign Application Priority Data
Apr. 23, 2013 (FR) .................................. 13 53712

(51) Int. Cl.
*H01M 8/1041* (2016.01)
*B01D 67/00* (2006.01)
(Continued)

(52) U.S. Cl.
CPC ...... *H01M 8/1041* (2013.01); *B01D 67/0079* (2013.01); *B01D 69/148* (2013.01);
(Continued)

(58) Field of Classification Search
CPC .......................... H01M 8/1041; H01M 8/1074
See application file for complete search history.

(56) References Cited

U.S. PATENT DOCUMENTS

2013/0092873 A1    4/2013  Buvat et al.

FOREIGN PATENT DOCUMENTS

CN        102324562        *  1/2012
WO     2007073500 A1        6/2007
(Continued)

OTHER PUBLICATIONS

Bian, X., et al., "Effect of Nano-TiO2 Particles on the Performance of PVDF, PVDF-g-(Maleic anhydride), and PVDF-g-Poly(acryl amide) Membranes", "Ind. Eng. Chem. Res.", Oct. 12, 2011, pp. 12113-12123, vol. 50.
(Continued)

*Primary Examiner* — Olatunji Godo
(74) *Attorney, Agent, or Firm* — Pearne & Gordon LLP (57) ABSTRACT

The invention relates to a process for preparing a composite material comprising a fluorinated polymeric matrix and a
(Continued)

filler consisting in ion exchange inorganic particles comprising a step for in situ synthesis of said particles within the polymeric matrix, said matrix comprising at least one first copolymer comprising at least two types of fluorinated recurrent units, a type of which bears at least one pendant maleic anhydride group.

25 Claims, 2 Drawing Sheets

(51) Int. Cl.

| | |
|---|---|
| B01D 69/14 | (2006.01) |
| C08F 2/46 | (2006.01) |
| C08J 5/22 | (2006.01) |
| C08F 259/08 | (2006.01) |
| C08F 8/42 | (2006.01) |
| C08K 3/34 | (2006.01) |
| H01M 8/1039 | (2016.01) |
| H01M 8/1048 | (2016.01) |
| H01M 8/1072 | (2016.01) |
| H01M 8/1023 | (2016.01) |
| H01M 8/1081 | (2016.01) |
| H01M 8/1018 | (2016.01) |

(52) U.S. Cl.
CPC ............... *C08F 2/46* (2013.01); *C08F 8/42* (2013.01); *C08F 259/08* (2013.01); *C08J 5/2275* (2013.01); *C08K 3/34* (2013.01); *H01M 8/1023* (2013.01); *H01M 8/1039* (2013.01); *H01M 8/1048* (2013.01); *H01M 8/1074* (2013.01); *H01M 8/1081* (2013.01); C08J 2327/22 (2013.01); H01M 2008/1095 (2013.01); H01M 2300/0082 (2013.01); Y02P 70/56 (2015.11)

(56) References Cited

FOREIGN PATENT DOCUMENTS

| | | |
|---|---|---|
| WO | 2011121078 A1 | 10/2011 |
| WO | 2011157727 A1 | 12/2011 |
| WO | 2014173888 A1 | 10/2014 |

OTHER PUBLICATIONS

Nagarale, R., et al., "OrganicInorganic Hybrid Membrane: Thermally Stable Cation-Exchange Membrane Prepared by the SolGel Method", "Macromolecules", Nov. 23, 2004, pp. 10023-10030, vol. 37.

* cited by examiner

PROCESS FOR PREPARING AN ION-EXCHANGE COMPOSITE MATERIAL COMPRISING A SPECIFIC POLYMER MATRIX AND A FILLER CONSISTING OF ION-EXCHANGE PARTICLES

CROSS-REFERENCE TO RELATED APPLICATIONS

This application is a U.S. national phase under the provisions of 35 U.S.C. § 371 of International Patent Application No. PCT/EP14/58116 filed Apr. 22, 2014, which in turn claims priority of French Patent Application No. 1353712 filed Apr. 23, 2013. The disclosures of such international patent application and French priority patent application are hereby incorporated herein by reference in their respective entireties, for all purposes.

TECHNICAL FIELD

The present invention relates to a process for preparing an ion-exchange composite material comprising a specific polymeric matrix and a filler consisting in ion exchange inorganic particles.

These materials prepared according to the method of the invention may find application in fields requiring an exchange of ions, as this is the case in the purification of effluents and in electrochemistry or in the fields of energy.

In particular, these composite materials may find their application in the design of fuel cell membranes, such as proton-conducting membranes for fuel cells operating with $H_2$/air or $H_2/O_2$ (these cells being known under the acronym of PEMFC for "proton exchange membrane fuel cell") or operating with methanol/air (these cells being known under the acronym of DMFC for "direct methanol fuel cell").

One of the general technical fields of the invention may thus be defined as being that of fuel cells and of proton-conducting membranes.

STATE OF THE PRIOR ART

A fuel cell is an electrochemical generator, which converts the chemical energy of an oxidation reaction of a fuel in the presence of an oxidizer into electric energy, heat and water.

Generally, a fuel cell includes a plurality of electrochemical cells mounted in series, each cell comprising two electrodes with opposite polarity separated by a proton exchange membrane acting as a solid electrolyte.

The membrane ensures the passing towards the cathode of the protons formed during the oxidation of the fuel at the anode.

The membranes structure the core of the cell and therefore should have good performances as regards proton conduction as well as low permeability to the reactive gases ($H_2$/air or $H_2/O_2$ for PEMFC cells and methanol/air for DMFC cells). The properties of the materials making up the membranes are essentially heat stability, resistance to hydrolysis and to oxidation as well as some mechanical flexibility.

Currently used membranes and meeting these requirements are membranes obtained from polymers for example belonging to the family of polysulfones, polyetherketones, polyphenylenes, polybenzimidazoles. However, it was seen that these non-fluorinated polymers degrade relatively rapidly in fuel cell surroundings and their lifetime for the moment remains insufficient for the PEMFC application.

Membranes having more significant properties as regards lifetime are membranes obtained from polymers consisting of a perfluorinated linear main chain and of side chains bearing an acid group, such as sulfonic acid groups. Among the most widely known, mention may be made of membranes marketed under the name of NAFION® by Dupont de Nemours or under the name of Dow®, FLEMION® or Aciplex® by Dow Chemicals and Asahi Glass or further Aquivion® produced by Solvay. These membranes have good electrochemical performances and an interesting lifetime but nevertheless insufficient for PEMFC applications. Further, their cost (more than 300 euros/m$^2$) remains prohibitive for marketing. For DMFC applications, they have a high permeability to methanol, which also limits their use with this type of fuel. Furthermore, the monomers making them up have a structure of the hydrophilic/hydrophobic type, which makes them particularly sensitive to hydration and dehydration phenomena. Thus, their operating temperature is typically located around 80° C., since beyond this temperature, hydration instabilities age the membranes prematurely.

In order to obtain long term efficiency as regards proton conduction at temperatures above 80° C., certain authors have focused their research on the design of more complex materials further comprising a polymeric matrix of proton-conducting particles, the conductivity thus not being entirely dedicated to the constitutive polymer(s) of the membranes. Consequently, it is thus possible to use a larger panel of polymers for entering the composition of the membrane.

Materials of this type may be composite materials comprising a polymeric matrix and a filler consisting in inorganic particles, such as clay particles, grafted with ion exchange groups.

Conventionally, these materials are prepared through two large synthesis routes: the route using a solvent and the route setting into play elements (in this case here, polymer and particles) in the molten state (subsequently called a molten route).

The route using a solvent consists of putting into contact the polymer and the inorganic particles in a solvent. The resulting mixture is then cast by coating on a substrate and then the solvent is left to evaporate.

This synthesis route has the advantage of being very simple to use and of not requiring any sophisticated apparatus. However, when it is intended to be applied on a large scale, this route poses difficulties in handling as to the volumes of solvent used and problems of safety inherent to the vapors of solvent which may be toxic or even carcinogenic. As to the obtained composite material, it is difficult to obtain proper density of the latter, notably related to the evaporation phenomenon of the solvent which generates a material structure which is difficult to control.

The molten route as for it consists in transforming precursor elements of the composite material (i.e., the polymer(s) and the particles) initially solid in a molten mixture. To do this, the particles are conventionally introduced by mechanical dispersion into the molten polymer. However, this technique, inter alia, has the problem of obtaining a fine and homogenous dispersion of the inorganic particles in the aforementioned polymer(s). The result of this is thus a material having non-uniform ion exchange properties, notably because of the concentration of particles by percolation at certain locations of the obtained final material.

Furthermore, whether this is via the solvent route or the molten route, it is difficult to obtain materials having a large proportion of ion exchange inorganic particles in the polymeric matrix.

Thus, there exists a real need for a novel process for preparing a composite material comprising, in a matrix, a dispersion of ion exchange inorganic particles, which for example may be applied for designing proton exchange membranes of a fuel cell, which would allow, inter alia:

obtaining in the resulting material, a homogenous distribution of the particles in the polymeric matrix and, thus, homogeneity as to the ion exchange properties;

obtaining, in the resulting material, when this is desired, significant proportions of ion exchange inorganic particles in the polymeric matrix.

DISCUSSION OF THE INVENTION

In order to overcome the aforementioned drawbacks, the inventors developed an innovative and inventive process for synthesizing a composite material, for which the ion exchange properties are totally or partly imparted by inorganic particles.

Thus the invention relates to a process for preparing a composite material comprising a fluorinated polymeric matrix and a filler consisting in ion exchange inorganic particles comprising a step for synthesis in-situ of said particles within the fluorinated polymeric matrix, said matrix comprising at least one first copolymer consisting in a copolymer comprising at least two types of fluorinated recurrent units, one type of which bears at least one maleic anhydride pendant group.

By proceeding in this way, one gets rid of the following drawbacks:

the mixing problems between the inorganic particles and the constitutive (co)polymer(s) of the polymeric matrix;

the inhomogeneous distribution problems of these particles within the (co)polymer(s);

the anisotropy problems as to the ion exchange properties encountered in the embodiments of the prior art, because of the mixing and distribution problems, notably when the particles are organized in macro-domains within the polymeric matrix, which does not give the possibility of ensuring a continuous path for proton transport, these problems being solved by the fact that the particles are generated in-situ within the matrix by the presence of a first specific copolymer as defined above, which fulfills the function of compatibilizing agent which allows these particles to be organized in micro-domains.

More specifically, the first copolymer as defined above contributes to reducing the surface energy difference between the constitutive inorganic particles of the very hydrophilic inorganic phase and the polymeric matrix.

Before entering more detail, the following definitions are specified.

By "synthesis step in-situ", is meant a synthesis step carried out in the actual inside of the polymeric matrix, which in other words means that the inorganic particles do not pre-exist outside the generally hydrophobic polymeric matrix.

By "ion exchange inorganic particles" are meant inorganic particles at the surface of which are bound one or several ion exchange organic groups.

These may be oxide particles functionalized with ion exchange groups, such as silica particles functionalized with ion exchange groups.

By fluorinated recurrent unit, is meant a recurrent unit for which the carbon atoms bear one or several fluorine atoms, which does not exclude that these carbon atoms may contain atoms other than fluorine, such as for example hydrogen atoms.

Regardless of the applied embodiment, the matrix may only consist of said first copolymer or may comprise at least one other (co)polymer distinct from said first (co)polymer, this distinct (co)polymer advantageously belonging to the family of hot-melt (co)polymers and more particularly of (co)polymers advantageously having a glassy transition temperature or melting temperature conventionally ranging from 100 to 350° C.

In particular, this distinct (co)polymer may be selected from among thermoplastic (co)polymers, such as fluorinated thermoplastic (co)polymers.

These may notably be fluorinated thermoplastic (co)polymers which do not exchange ions, such as a (co)polymer comprising at least one type of current units from a fluorinated monomer, for example polytetrafluoroethylenes (known under the acronym of PTFE), poly(vinylidene fluoride)s (known under the acronym of PVDF), fluorine ethylene-propylene copolymers (known under the acronym of FEP), copolymers of ethylene and tetrafluoroethylene (known under the acronym of ETFE) or such as a copolymer comprising at least two types of current units from fluorinated monomers, for example a copolymer of vinylidene fluoride and hexafluoropropene (known under the acronym of PVDF-HFP), and mixtures thereof.

These may also be ion exchange fluorinated thermoplastic (co)polymers, such as sulfonated perfluorinated (co)polymers. It is specified that, by sulfonated perfluorinated (co)polymers, are meant (co)polymers comprising a perfluorinated linear main chain and the side chains bearing sulfonic acid groups. Such (co)polymers are notably commercially available under the registered trade name of Nafion® by DuPont de Nemours, or ACIPLEX S® from Asahi Chemical or further Aquivion® from Solvay.

Fluorinated (co)polymers, because of the presence of stable —C—F bonds (with a binding energy of 485 kJ/mol) form (co)polymers having excellent properties and characteristics, such as anti-adhesion, abrasion resistance, resistance to chemical etching and to temperature.

Advantageously, the process of the invention may be applied, with a matrix comprising, in addition to said first copolymer, a copolymer of the PVDF-HFP type, interesting for the stability of its fluorinated backbone, its low production cost.

The step for synthesis in-situ of the inorganic particles may be carried out with the sol-gel method, i.e. precursors of said particles undergo a hydrolysis-condensation operation in the actual inside of the material.

According to a first alternative, the synthesis step may comprise the following operations:

an operation for putting the first copolymer and if necessary the distinct constitutive (co)polymer(s) of the matrix, in contact with one or several precursors of the inorganic particles, said precursor(s) fitting the following formula (I):

$$(X)_{y-n}\text{-M-}(R)_n \qquad (I)$$

wherein:

M is a metal element or a metalloid element;

X is a hydrolyzable chemical group;

R is an ion exchange chemical group or a precursor group of an ion exchange chemical group;

y corresponds to the valency of element M; and n is an integer ranging from 0 to (y−1);

a hydrolysis-condensation operation of said precursor(s), in return for which inorganic particles resulting from the hydrolysis-condensation of said precursors are obtained;

in the case when R is a precursor group of an ion exchange chemical group, an operation for transforming the precursor group into an ion exchange chemical group or, in the case when n=0, an operation for functionalization of said particles with ion exchange chemical groups.

The hydrolysis-condensation operation may consist of heating the mixture from the contacting step at an effective temperature, for example at a temperature ranging from 150 to 300° C. for generating said hydrolysis-condensation operation, optionally in the presence of a catalyst.

The step for synthesis in-situ carried out according to the first alternative has the following advantages:

good miscibility between the precursors, the first copolymer and if necessary the distinct (co)polymer(s) entering the composition of the matrix which finally gives the possibility, if desired, of accessing large proportions of inorganic particles in the matrix;

the absence of use of organic solvents, conventionally used in processes for preparing composite materials of the type of the invention, which gives the possibility of doing without recurrent toxicity and porosity problems inherent to the use of an organic solvent.

In order to avoid the use of a catalyst and the problems which may be generated by poor dispersion of this catalyst during the contacting step, according to the invention a proposal is made for achieving the step for synthesis in-situ of the inorganic particles, according to a second alternative, which step is carried out by a sol-gel method comprising the following operations:

an operation for hydrolysis of one or several precursors of inorganic particles of the following formula (I):

$(X)_{y-n}\text{-}M\text{-}(R)_n$ (I)

wherein:

M is a metal element or a metalloid element;

X is a hydrolyzable chemical group;

R is an ion exchange chemical group or a precursor group of an ion exchange chemical group;

y corresponds to the valency of element M; and n is an integer ranging from 0 to (y−1);

an operation for putting the hydrolyzate obtained in the preceding step in contact with the first copolymer and if necessary the distinct (co)polymer(s) entering the composition of the matrix as defined above;

an operation for heating the resulting mixture at an effective temperature for generating transformation of the hydrolyzate into inorganic particles;

in the case when R is a precursor group of an ion exchange chemical group, an operation for transforming the precursor group into an ion exchange chemical group or, in the case when n=0, an operation for functionalizing said particles with ion exchange chemical groups.

The aforementioned hydrolysis operation may consist of putting said precursors into contact with an aqueous acid solution optionally comprising one or several alcoholic solvents.

Thus, as an example, said precursors may be put into contact with an amount of water, so as to attain a molar ratio between the hydrolyzable functions of the precursors and the number of moles of water generally comprised between 0.001 and 1,000, preferably between 0.1 and 10.

The addition of water may, depending on the precursors used, lead to de-mixing of phases because of a miscibility problem between water and the precursors. Thus, it may be useful to add an alcoholic solvent in determined proportions (for example, methanol, ethanol, propanol), in order to improve the miscibility of the precursors in water. Generally, the alcoholic solvent may be added by observing a mass ratio with water ranging up to 100, in particular being comprised between 0 and 1. Furthermore, in order to activate hydrolysis, it may be advantageous to acidify the solution, so as to obtain a resulting solution advantageously having a pH of less than 2. This acidification may be achieved by adding to the solution an acid, such as hydrochloric acid, sulfuric acid, nitric acid or an organic acid, such as methanesulfonic acid.

Once the hydrolysis operation is carried out, the hydrolyzate is added to the first copolymer and if necessary to the distinct (co)polymers entering the composition of the matrix followed by an operation for heating to an effective temperature for transforming the hydrolyzate into inorganic particles.

This temperature may easily be determined by one skilled in the art by performing tests at different temperatures until a temperature is found at which the hydrolyzate gives rise to inorganic particles.

Whether this is for the first alternative or the second alternative, the metal element M may be selected from a group formed with transition metals, lanthanide metals and so called post-transition metals of the columns IIIA and IVA of the Periodic Classification of the Elements. In particular, the transition metal element may be selected from Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt). In particular, the lanthanide element may be selected from La, Ce, Pr, Nd, Sm, Eu, Gd, Tb, Dy, Er, Yb. In particular, the post-transition metal element may be selected from the elements of column IIIA of the periodic classification, such as Al, Ga, In and Tl and the elements of the column IVA of the periodic classification, such as Ge, Sn and Pb.

The metalloid element M may be selected from Si, Se, Te.

Advantageously, M may be an element selected from Si, Ti and Al, in particular, Si.

The hydrolyzable group X should advantageously be a good leaving group during the hydrolysis-condensation operation mentioned above.

This group X may for example be a halogen atom, an acrylate group, an acetonate group, an alcoholate group of formula —OR', a secondary or tertiary amine group, wherein R' represents an alkyl group for example comprising from 1 to 10 carbon atoms, in particular, an ethyl group.

Preferably, X is a group —OR' as defined above, or a halogen atom.

When the group R is an ion exchange chemical group, this may be a cation exchange chemical group (for example, a proton exchanger) or an anion exchange chemical group.

The group R may be a group of formula $—R^2—Z$, wherein $R^2$ is a simple bond, a linear or branched alkylene group, comprising from 1 to 30 carbon atoms, preferably from 1 to 10 carbon atoms and optionally for which one or several hydrogen atoms are substituted with a halogen atom, such as fluorine or $R^2$ is a cyclic hydrocarbon group, and Z is an ion exchange chemical group.

In particular, when it is a cation exchange group, the group R may be a group of formula $—R^2—Z^1$, wherein:

$R^2$ is a simple bond, a linear or branched alkylene group for example comprising from 1 to 30 carbon atoms, preferably from 1 to 10 carbon atoms and optionally for which one or several hydrogen atoms are substituted with a halogen atom, such as fluorine, or $R^2$ is a cyclic hydrocarbon group, such as an aromatic or heterocyclic group;

$Z^1$ is a group $—SO_3H$, $—PO_3H_2$, $—CO_2H$, optionally as salts.

It is specified that by salt, is conventionally meant a group $—SO_3X$, $—PO_3X_2$ or $—CO_2X$ wherein X represents a cation.

As an example, $R^2$ may be a perfluoroalkylene group, such as a group $—CF_2—$.

When it is an anion exchange group, the group R may be a group of formula $—R^2—Z^2$, wherein:

$R^2$ is a simple bond, a linear or branched alkylene group, for example comprising from 1 to 30 carbon atoms, preferably from 1 to 10 carbon atoms and optionally for which one or several hydrogen atoms are substituted with a halogen atom, such as fluorine or $R^2$ is a cyclic hydrocarbon group, such as an aromatic or heterocyclic group;

$Z^2$ is an amine group, optionally as a salt (in which case this will be referred to as an ammonium group), a phosphonium group or a sulfonium group.

It is specified that, by phosphonium group is conventionally meant a group comprising a positively charged phosphorus atom, this group may originate from the reaction of a phosphine compound (such as triphenylphosphine) with an alkyl halide or a benzyl alcohol.

It is specified that by a sulfonium group, is conventionally meant a group comprising a positively charged sulfur atom, this group may originate from a reaction of a thioester compound with an alkyl halide.

As an example, $R^2$ may be a perfluoroalkylene group, such as a group $—CF_2—$.

It is specified above that group R may also be a precursor chemical group of an ion exchange group.

By precursor chemical group of an ion exchange group, is conventionally meant a group capable of being transformed by a suitable chemical reaction into said ion exchange group.

Such a group R may be a group of formula $—R^2—Z^3$, wherein:

$R^2$ is a simple bond, a linear or branched alkylene group, for example comprising from 1 to 30 carbon atoms, preferably from 1 to 10 carbon atoms and optionally for which one or several hydrogen atoms are substituted with a halogen atom, such as fluorine or $R^2$ is a cyclic hydrocarbon group, for example an aromatic or heterocyclic group;

$Z^3$ is a precursor group of a group $Z^1$ or group $Z^2$ as mentioned above.

When a precursor of this type (i.e. a precursor comprising a precursor group of an ion exchange group) is used, it is necessary to engage an operation for transforming the precursor group into an ion exchange chemical group.

Thus, when the group $Z^1$ is a group $—SO_3H$ optionally as a salt, the group $—Z^3$ may be a thiol group $—SH$, which will undergo a transformation operation consisting of subjecting it to oxidation with hydrogen peroxide followed by acidification with concentrated sulfuric acid.

When the group $Z^1$ is a group $—CO_2H$ optionally as a salt, the group $—Z^3$ may be an ester group or an acid chloride group which may be transformed into a $—CO_2H$ group optionally as a salt by hydrolysis.

The aforementioned precursors may advantageously be alkoxysilanes or halogenosilanes (in which case M is Si and X is a group $—OR'$ or a halogen atom) comprising at least one group R as defined above.

Precursors fitting this specificity may thus be precursors fitting the following formula (II):

$$(OR')_{4-n}—Si—(R)_n \qquad (II)$$

wherein:

R' is as defined above;

R corresponds to the formula $—R^2—Z^3$, $R^2$ being a linear or branched alkylene group, comprising from 1 to 30 carbon atoms, preferably from 1 to 10 carbon atoms, and optionally for which one or several hydrogen atoms are substituted with a halogen atom, such as fluorine and $Z^3$ is a precursor group of a group $Z^1$ or a group $Z^2$ as mentioned above;

n is an integer ranging from 1 to 3.

For example, $Z^3$ may be a thiol group.

As an example, mention may be made of mercaptopropyltriethoxysilane of formula $HS—(CH_2)_3—Si(OCH_2CH_3)_3$.

When, for the aforementioned precursors, n is equal to 0, it is necessary at the end of the process to carry out an operation for functionalizing said particles by introducing on said particles ion exchange chemical groups.

The suitable functionalization reactions will be selected by one skilled in the art depending on the obtained and desired material. This may for example be substitution reactions on aromatic rings, additional reactions on unsaturated bonds, oxidation reactions of oxidizable groups, the result of these reactions having the consequence of grafting by covalence to the particles of ion exchange groups.

The aforementioned precursors, regardless of the alternative used, and in particular for the second alternative, may be used in combination with a pre-condensate comprising recurrent units of the following formula (III):

$$+\!\!\operatorname{M(X)}_{y-2}\!\!+ \qquad (III)$$

wherein:

M is a metal or metalloid element as defined above;

X is a group as defined above;

y corresponds to the valency of the metal or metalloid element.

In particular, X may correspond to a group $—OR'$ with R' being as defined above.

As an example, this may thus be a precondensate of dimethoxysilane comprising the recurrent units of the following formula (IV):

$$+\!\!\operatorname{Si(OCH_3)_2}\!\!+ \qquad (IV)$$

Precondensates may give the possibility of ensuring the structuration of the inorganic particles, for example by increasing their cohesion.

The mass levels between the aforementioned precursors and the pre-condensates will be adapted so as to obtain the best compromise between structuration and functionalization.

As an example, the mass ratio (precursor/precondensate) may be comprised between 0.01 and 50 and more generally between 0.1 and 20.

Regardless of the envisioned embodiment, the mass ratio of the aforementioned precursors (optionally in a combination with at least one precondensate as defined above) relatively to the constitutive (co)polymers of the matrix may range up to 80%, advantageously from 5 to 50%.

The first copolymer, used as a compatibilizing agent, consists in a copolymer comprising at least two types of fluorinated recurrent units, one type of which bears at least one pendant maleic anhydride group.

More specifically, the first copolymer may consist in a copolymer comprising, in addition to the fluorinated recurrent unit bearing a pendant maleic anhydride group, a recurrent unit fitting the following formula (V).

(V)

wherein $R^3$, $R^4$, $R^5$ and $R^6$ represent, independently of each other, a hydrogen atom, a halogen atom, a perfluoroalkyl group or a perfluoroalkoxy group, provided that at least one of the groups $R^3$ to $R^6$ represents a fluorine atom, a perfluoroalkyl group or a perfluoroalkoxy group, in which case the fluorinated ethylene monomer allowing this recurrent unit to be obtained is a monomer of the following formula (VI):

(VI)

$R^3$ to $R^6$ being as defined above.

By perfluoroalkyl group is conventionally meant, in the foregoing and in the following, an alkyl group for which all the hydrogen atoms are replaced with fluorine atoms, this group fitting the formula —$C_nF_{2n+1}$, n corresponding to the number of carbon atoms, this number may range from 1 to 5, such a group may be a group of formula —$CF_3$.

By perfluoroalkoxy group, is conventionally meant in the foregoing and in the following, an —O-alkyl group for which all the hydrogen atoms are replaced with fluorine atoms, this group fitting the formula —O—$C_nF_{2n+1}$, n corresponding to the number of carbon atoms, this number may range from 1 to 5, such a group may be a group of formula —O—$CF_3$.

Thus, a particular recurrent unit covered by the general definition of the recurrent units of formula (V) may correspond to a recurrent unit of the following formula (VII):

(VII)

in return for which the monomer, from which stems this recurrent unit, fits the following formula (VIII):

(VIII)

this monomer being known as vinylidene fluoride.

Other particular recurrent units covered by the general definition of the recurrent units of formula (V) may correspond to the following particular units:

a recurrent unit for which $R^3$, $R^4$ and $R^6$ are fluorine atoms and $R^5$ is a chlorine or bromine atom, in which case the monomer, from which stems this recurrent unit, is chlorotrifluoroethylene (known under the acronym of CTFE) or bromotrifluoroethylene;

a recurrent unit for which $R^3$, $R^4$ and $R^5$ are fluorine atoms and $R^6$ is a group —$CF_3$, which recurrent unit thus fitting the following formula (IX):

(IX)

a recurrent unit for which $R^3$, $R^4$ and $R^5$ are fluorine atoms and $R^6$ is a hydrogen atom, in which case the monomer, from which stems this recurrent unit, is trifluoroethylene (known under the acronym of TrFE);

a recurrent unit for which $R^3$ to $R^6$ are fluorine atoms, in which case the monomer, from which stems this recurrent unit, is tetrafluoroethylene (known under the acronym of TFE);

a recurrent unit for which $R^3$ to $R^5$ are fluorine atoms and $R^6$ is an —$OCF_3$ group;

a recurrent unit for which $R^3$ to $R^5$ are hydrogen atoms and $R^6$ is a fluorine atom;

a recurrent unit for which $R^3$ to $R^5$ are hydrogen atoms and $R^6$ is a —$CF_3$ group;

a recurrent unit for which $R^3$ and $R^5$ are fluorine atoms and $R^4$ and $R^6$ are chlorine atoms;

a recurrent unit for which $R^3$ and $R^4$ are fluorine atoms, $R^5$ is a hydrogen atom and $R^6$ is a bromine atom.

Particularly, the first copolymer may consist in a copolymer comprising in addition to a fluorinated recurrent unit comprising a pendant maleic anhydride group, a first type of recurrent unit of the aforementioned formula (VII) and a second type of recurrent unit of the aforementioned formula (IX).

As for the fluorinated recurrent unit comprising a pendant maleic anhydride group, the latter may fit the following formula (X):

(X)

wherein:

$R^7$ to $R^9$ represent, independently of each other, a hydrogen atom, a halogen atom, a perfluoroalkyl group.

Thus, a particular recurrent unit covered by the general definition of the recurrent units of formula (X) may correspond to a recurrent unit of the following formula (XI):

(XI)

A first specific copolymer according to the definition of the invention is a copolymer comprising a first type of recurrent unit of the aforementioned formula (VII), a second type of recurrent unit of the aforementioned formula (IX) and a third type of recurrent unit of the aforementioned formula (XI). More specifically, this copolymer may advantageously comprise a mass content of the unit of the aforementioned formula (IX) ranging from 3 to 35% by mass, preferably from 13 to 18% by mass, based on the total mass of the copolymer.

Advantageously, according to the invention, the first copolymer may comprise one or several recurrent units (for example, those of the aforementioned formulae (VII) and (IX)) with formulae identical with those of the recurrent units if necessary of the distinct (co)polymers entering the composition of the fluorinated polymeric matrix.

More specifically, when the fluorinated polymeric matrix comprises, in addition to the first copolymer, a copolymer of vinylidene fluoride and of hexafluoropropene, the first copolymer advantageously comprises, In addition to the fluorinated recurrent unit comprising a pendant maleic anhydride group, a recurrent unit of the aforementioned formula (VII) and a recurrent unit of the aforementioned formula (IX).

In other words, the first copolymer may be of the same nature as the distinct (co)polymer(s) entering the composition of the matrix, except that a controlled fraction of recurrent units is a modified by the introduction of a pendant maleic anhydride group, which gives the possibility of ensuring good compatibility between the hydrophobic phases of the fluorinated polymer matrix and the hydrophilic phase consisting of the inorganic portion of the composite material. The use of such a first copolymer gives the possibility of doing without the homogenization problems which may be encountered with compatibilizing agents which would be of a nature very different from that of the matrix.

In the matrix, the first copolymer may be comprised in a content ranging from 0.5 to 100% by mass, preferably from 2 to 8% by mass based on the mass of the polymeric matrix.

The first copolymer may be prepared beforehand with a process comprising the following steps:
 a step for irradiating a base copolymer (for example PVDF or PVD-HFP), for example by means of γ radiation in the presence of unsaturated maleic anhydride;
 a step for heating, for example by ovening, for a suitable duration and temperature (for example, 120° C. for 12 hours) in order to obtain grafting of maleic anhydride by a radical reaction with radical centers generated at the base copolymer; and
 optionally a step for removing the compounds not bound to the thereby formed copolymer.

The irradiation step may consist of applying doses allowing control of the grafting level of maleic anhydride, for example, by applying a dose ranging from 10 to 50 kGy.

The removal step may consist of applying vacuum dynamically for a suitable time (for example, a duration which may range up to 72 hours) in order to remove said compounds not bound to the copolymer, notably when they are volatile.

Advantageously, the base copolymer (for example PVDF or PVDF-HFP) may be modified so as to comprise a mass proportion of a recurrent unit of formula (XI) ranging from 0.01 to 2% based on the total mass of the recurrent units of formulae (VII) and (XI).

The step for synthesis in situ of the particles may advantageously be achieved by extrusion of the (co)polymer(s) intended to form the matrix (i.e. the first copolymer and optionally the distinct (co)polymer(s)), and aforementioned precursors (for the first alternative) and hydrolyzate (for the second alternative) and optionally, for both of these alternatives, in the presence of a precondensate as defined above, which means that the contacting operation and the heating operation (according to the first alternative and the second alternative) take place inside an extruder, the other operations may be performed outside the extruder.

Thus, in this scenario, the (co)polymer(s) making up the matrix and the aforementioned precursors (for the first alternative) or the hydrolyzate (for the second alternative) optionally, for both of these alternatives, in the presence of a pre-condensate, are preferably introduced simultaneously, through at least one inlet of an extruder, where they are intimately mixed (which is the aforementioned contacting step). The (co)polymer(s) may be introduced as powders, shavings or granules, the latter form being the preferred form for reasons of easy handling and supply. The thereby formed mixture then migrates in the extruder until it attains the end of the latter.

The formation of the inorganic particles via the precursors or the hydrolyzate is achieved during the dwelling of the mixture in the extruder by heating according to a particular temperature profile, so that the characteristic hydrolysis-condensation reactions of the sol-gel process notably are triggered. This may thus be referred to as a reactive extrusion.

The operating conditions of the extrusion, such as the screw profile, the dwelling time of the mixture, the rotary speed of the screw will be set by one skilled in the art depending on the desired morphology of the final material and on the sought dispersion of inorganic particles in the polymeric matrix.

As an example, the extrusion may be advantageously achieved with the following operating conditions:
 a screw profile of the co-rotary interpenetrated twin screw;
 a dwelling time of the aforementioned mixture comprised between 0.1 minutes and 120 minutes, preferably from 2 to 30 minutes;
 a speed of rotation of the screw comprised between 5 and 1,000 revolutions/minute, preferably between 50 and 200 revolutions/min;
 a mixture temperature ranging from 150 to 350° C., preferably from 180 to 250° C.

The extruder may be equipped with a flat die giving the possibility of obtaining films which may have a thickness ranging from 5 to 500 μm or further with a so-called "ring die" giving the possibility of obtaining rings or optionally granules, if the rings are brought to be cut.

As an example, a particular process of the invention consists in a process for synthesizing a composite material comprising a polymeric matrix and a filler consisting in oxide particles, such as silica, comprising ion exchange groups of formula —$R^2$—$Z^1$ as defined above comprising the following operations:

an operation for putting into an extruder the first copolymer (for example, a copolymer comprising a first recurrent unit of formula (VII), a second recurrent unit of formula (IX) and a third recurrent unit of formula (X)) and if necessary distinct (co)polymer(s) entering the composition of the polymeric matrix in contact with one or several precursors of the aforementioned inorganic particles, said precursor(s) fitting the following formula (I):

$(X)_{y-n}$-M-$(R)_n$ (I)

wherein:
M is a metal element or a metalloid element;
X is a hydrolyzable chemical group;
R is a group of formula —$R^2$—$Z^3$ as defined above;
y corresponds to the valency of group M; and
n is a integer ranging from 0 to (y−1);
said precursor(s) being used in association with a precondensate of the following formula (III):

(III)

M, X and y being as defined above;
a hydrolysis-condensation operation, in the extruder of said precursor(s) in association with said precondensate, in return for which inorganic particles resulting from the hydrolysis-condensation of said precursors and of said precondensate are obtained;
an operation for transforming the aforementioned group $Z^3$ into an ion exchange chemical group $Z^1$.
For example, the precursor may be a precursor of the following formula (II):

$(OR')_{4-n}$—Si—$(R)_n$ (II)

wherein:
R' is as defined above;
R corresponds to the formula —$R^2$—$Z^3$, $R^2$ is an alkylene group comprising from 1 to 30 carbon atoms, preferably from 1 to 10 carbon atoms, and optionally for which one or several hydrogen atoms are substituted with a halogen atom, such as fluorine and $Z^3$ being a precursor group of a group $Z^1$ or a group $Z^2$ as mentioned above;
n is a integer ranging from 1 to 3.
A precursor fitting this definition given above may be mercaptopropyltriethoxysilane of formula HS—$(CH_2)_3$—Si$(OCH_2CH_3)_3$ and the precondensate may be a precondensate for which M is Si and X is an —OR' group, R' being as defined above, such as a precondensate of the polytetramethoxysilane type.
The distinct (co)polymer may be a copolymer of vinylidene fluoride and hexafluoropropene.
As an example, a particular process of the invention consists in a process for synthesizing a composite material comprising a polymeric matrix and a filler consisting in oxide particles, such as silica, comprising ion exchange groups of formula —$R^2$—$Z^1$ as defined above, comprising the following operations:
an operation for hydrolysis of one or several precursors of the inorganic particles of the following formula (I):

$(X)_{y-n}$-M-$(R)_n$ (I)

M is a metal element or a metalloid element;
X is a hydrolyzable chemical group;
R is a group of formula —$R^2$—$Z^3$ as defined above;
y corresponds to the valency of group M; and
n is an integer ranging from 0 to (y−1);

said precursor(s) being used in association with a precondensate of the following formula (III):

(III)

M, X and y are as defined above;
an operation for putting into an extruder the hydrolyzate obtained in the preceding step in contact with the first copolymer (for example, a copolymer comprising a first recurrent unit of formula (VII), a second recurrent unit of formula (IX) and a third recurrent unit of formula (XI)) and if necessary the distinct (co)polymer(s) entering the composition of the polymeric matrix;
an operation for heating the resulting mixture to an effective temperature for generating transformation of the hydrolyzate into inorganic particles;
an operation for transforming the aforementioned group $Z^3$ into an ion exchange chemical group $Z^1$.
For example, the precursor may be a precursor of the following formula (II):

$(OR')_{4-n}$—Si—$(R)_n$ (II)

wherein:
R' is as defined above;
R corresponds to the formula —$R^2$—$Z^3$, $R^2$ being an alkylene group comprising from 1 to 30 carbon atoms, preferably from 1 to 10 carbon atoms, and optionally for which one or several hydrogen atoms are substituted with a halogen atom, such as fluorine and $Z^3$ being a precursor group of a group $Z^1$ or a group $Z^2$ as mentioned above;
n is an integer ranging from 1 to 3.
A precursor fitting this definition given above may be mercaptopropyltriethoxysilane of formula HS—$(CH_2)_3$—Si$(OCH_2CH_3)_3$ and the precondensate is a precondensate, for which M is Si and X is a group of formula —OR', R' being as defined above, such as a precondensate of the polytetramethoxysilane type.
The distinct (co)polymer may be a copolymer of vinylidene fluoride and of hexafluoropropene.
The materials obtained according to the invention may appear in different shapes, such as films, rings, granules.
These materials because of the characteristics of the process, may have the following advantages:
  if desired, a large proportion of ion exchange inorganic particles in the polymeric matrix (for example, a proportion which may be greater than 40% by mass), thereby giving the possibility of attaining excellent ion exchange properties which no longer depend on the selection of the polymer(s);
  a homogenous material as to the distribution of said particles within the material and thus homogenous ion exchange properties within this material;
  a material for which the mechanical properties of the matrix are not at all diminished by the presence of the inorganic particles, which may explain, without being bound by theory, that the particles are not organized in percolated domains because they are produced in situ in the actual inside of the matrix.
These materials may be defined, according to the invention, as composite materials comprising a fluorinated polymeric matrix, as defined above and a filler consisting in ion exchange inorganic particles.
The characteristics relating to the polymeric matrix and the ion exchange inorganic particles outlined in the process may be repeated for taking into account the materials as such.

More specifically, a material according to the invention may be a material for which:

the polymeric matrix is a matrix comprising a first copolymer comprising, in addition to the fluorinated recurrent unit comprising a pendant maleic anhydride group, a recurrent unit of the aforementioned formula (VII) and a recurrent unit of the aforementioned formula (IX), and comprising a copolymer of a vinylidene fluoride, and of hexafluoropropene; and;

silica particles functionalized with proton conducting groups of formula —$(CH_2)_3$—$SO_3H$.

The process of the invention as well as the materials of the invention may be applied to large fields of application, from the moment that these fields involve the use of ion exchange materials.

Thus, the process of the invention and the materials of the invention may for example be applied to the following fields:

the field of electrochemistry, such as:

fuel cells, for example fuel cells operating with $H_2$/air or $H_2$/$O_2$ (known under the acronym of PEMFC for "proton exchange membrane fuel cell") or operating with methanol/air (known under the acronym of DMFC for "direct methanol fuel cell"), said materials designed by this process may enter the structure of proton exchange membranes;

lithium batteries, said materials designed with this process may enter the structure of the electrolytes;

the field of purification, such as treatment of effluents; and the field of electrochromism.

Thus, the materials of the invention resulting from this process may be intended for entering the composition of electrolytic fuel cell membranes, intended to be inserted into a fuel cell device within an electrode-membrane-electrode assembly.

These membranes advantageously appear as thin films, for example having a thickness from 20 to 200 micrometers.

In order to prepare such an assembly, the membrane may be placed between two electrodes, for example in fabric or in a carbon paper impregnated with a catalyst. The assembly formed with the membrane positioned between both electrodes is then pressed at an adequate temperature in order to obtain good electrode-membrane adhesion.

The electrode-membrane-electrode assembly is then placed between two plates ensuring electric conduction and supply of reagents to the electrodes. These plates are commonly designated by the term of bipolar plates.

The invention will now be described with reference to the following examples given as an illustration and not as a limitation.

DETAILED DISCUSSION OF PARTICULAR EMBODIMENTS

Example 1

This example illustrates the preparation of various materials according to the invention including, before introduction into the extruder, a step for pre-hydrolysis of the precursors, the preparation methods of which are mentioned in the examples above.

The general operating procedure of this pre-hydrolysis step is the following.

x g of ethanol then y g of a $10^{-2}$ N hydrochloric acid solution are consecutively added to a previous mixture of A g of mercaptopropyltriethoxysilane [HS—$(CH_2)_3$—$Si(OEt)_3$] and B g of a precondensate of dimethoxysilane, for which the recurrent unit is —$Si(OCH_3)_2$—O—.

After a reaction time of 2 hours at room temperature, the mixture of precursors is used (subsequently called a hydrolyzate) for the extrusion step.

The operating conditions of the pre-hydrolysis step for the different tests applied are listed in the table below (with x=y).

| Test | A (in g) | B (in g) | x and y (in g) |
|---|---|---|---|
| 1 | 4.73 | 5.27 | 1.43 |
| 2a, 2b | 9.52 | 1.61 | 1.35 |
| 3 | 10.31 | 3.67 | 1.34 |

The different hydrolyzates obtained from these tests are then applied for forming, according to the method of the invention, composite materials including functionalizing inorganic particles and compatibilized with the matrix.

The operating procedure is the following:

In a micro-extruder provided by DSM, provided with two conical screws and a flat die, 11.4 g of a PVDF-HFP copolymer, 0.6 g of the first copolymer consisting in a copolymer of the aforementioned recurrent units of formulae (VII), (IX) and (XI) (this copolymer will be subsequently designated with PVDF-HFP-ADX, resulting from the transformation of a PVDF-HFP copolymer with 0.1% by mass of maleic anhydride) as well as the hydrolysates prepared beforehand are gradually incorporated, for which the characteristics in terms of ingredients appear in the table above.

The mixing is carried out at 200° C. with a screw speed of 100 rpm until the torque is stabilized. The material is then extracted at the outlet by means of a micro-calendering machine also provided by DSM. Finally, a film of a hybrid material is recovered with a thickness comprised between 20 and 300 μm.

The PVDF-HFP-ADX copolymer used above may be prepared beforehand according to the following procedure.

A mixture is prepared of Kynar Flex PVDF 2750 and of 2% by mass of maleic anhydride. This mixture is prepared by using a twin screw extruder at 230° C. and at 150 revolutions/minute at a flow rate of 10 kg/h. After the extrusion step, 1.8% of maleic anhydride remains in the product, the remainder being lost during the extrusion step. The thereby prepared part the is packaged in leak-proof aluminium bags. These bags are then irradiated under 3 Mrad. A grafting level of 20% to 30% is determined, this level being verified after a solubilization-precipitation step. The product is then placed in vacuo for one night at 130° C. in order to discharge the residual maleic anhydride and the hydrofluoric acid released during the irradiation.

The table below groups the different proportions (in percent by mass based on the total mass of the mixture) of mercaptopropyltriethylsilane (below said to be the compound —SH), of dimethoxysilane (below said to be the precondensate) and of the PVDF-HFP-ADX copolymer applied for the different tests.

| Test | PVDF-HFP | | Compound —SH | | Precondensate | | PVDF-HFP-ADX | |
|---|---|---|---|---|---|---|---|---|
| | m (g) | % m | m (g) | % m | m (g) | % m | m (g) | % m |
| 1 | 11.4 | 51.82 | 4.73 | 21.50 | 5.27 | 23.95 | 0.6 | 2.73 |
| 2a | 11.4 | 49.29 | 9.52 | 41.16 | 1.61 | 6.96 | 0.6 | 2.59 |
| 2b | 11.4 | 50.60 | 9.52 | 42.25 | 1.61 | 7.15 | 0 | 0 |
| 3 | 11.4 | 43.88 | 10.31 | 39.68 | 3.67 | 14.13 | 0.6 | 2.31 |

The table above groups the characteristics of the material in terms of mass percentages of —SH function, of functional inorganic particles as mentioned above and of non-functional silica particles.

| Test | PVDF-HFP + PVDF-HFP-ADX except for test 2b not including PVDF-HPP-ADX Mass (in g) | Function —SH | | Non-functional inorganic particles | | Functional inorganic particles | |
|---|---|---|---|---|---|---|---|
| | | Mass (in g) | Mass % | Mass (in g) | Mass % | Mass (in g) | Mass % |
| 1 | 12 | 2.52 | 14.40 | 4.01 | 22.91 | 5.50 | 31.42 |
| 2a | 12 | 5.07 | 28.20 | 2.99 | 16.61 | 5.98 | 33.26 |
| 3 | 12 | 5.49 | 28.07 | 4.32 | 22.09 | 7.57 | 38.67 |
| 2b | 11.4 | 5.07 | 29.17 | 2.99 | 17.20 | 5.98 | 34.41 |

The SH function mass corresponds to the mass of HS—$CH_2$—$CH_2$—$CH_2$—$SiO_{3/2}$ created after hydrolysis-condensation reaction of mercaptopropyltriethoxysilane, i.e. corresponds to (A*127/238.42), A corresponding to the aforementioned mercaptopropyltriethoxysilane mass, 127 corresponding to the molar mass of HS—$CH_2$—$CH_2$—$CH_2$—$SiO_{3/2}$ and 238.42 corresponding to the molar mass of mercaptopropyltriethoxysilane.

The mass percentage of —SH function is a mass percentage of SH based on the total mass of the final material.

This mass percentage, after considering the hydrolysis-condensation reactions, is evaluated with the following formula:

$$\% = (A*127/238.42)/[(A*127/238.42)+(B*60/106.2)+C+D]*100$$

wherein:

A, B, C and D respectively correspond to the masses of mercaptopropyltriethoxysilane (molar mass of 238.42), of dimethoxysilane precondensate (molar mass of 106.2), of PVDF-HFP and of PVDF-HFP-ADX; and 60 corresponds to the molar mass of $SiO_2$ from the hydrolysis-condensation of the pre-condensate.

The mass and the mass percentage of functional inorganic particles are determined in the following way.

$$\text{Mass} = (A*127/238.42)+(B*60/106.2) \quad \% = [(A*127/238.42+B*60/106.2)]/[(A*127/238.42)+(B*60/106.2)+C+D]*100$$

The mass and the mass percentage of non-functional inorganic particles are determined in the following way.

$$\text{Mass} = (A*52/238.42)+(B*60/106.2) \quad \% = [(A*52/238.42+B*60/106.2)]/[(A*127/238.42)+(B*60/106.2)+C+D]*100$$

52 corresponds to the molar mass of $SiO_{3/2}$ from the hydrolysis-condensation reactions of the mercaptopropyltriethoxysilane compounds.

The behavior and the final properties of the obtained hybrid materials strongly depend on the morphology and therefore on the size of the fillers as well as on their dispersions within the polymeric matrix. The PVDF-HFP-ADX copolymer is used at 5% by mass based on PVDF-HFP. FIGS. 1 to 4 appended as an annex illustrate photographs of the materials respectively obtained in tests 1, 2 and 3, the last figure (FIG. 4) being a photograph of the material obtained without any PVDF-HFP-ADX copolymer (test 2b).

Figure 1:
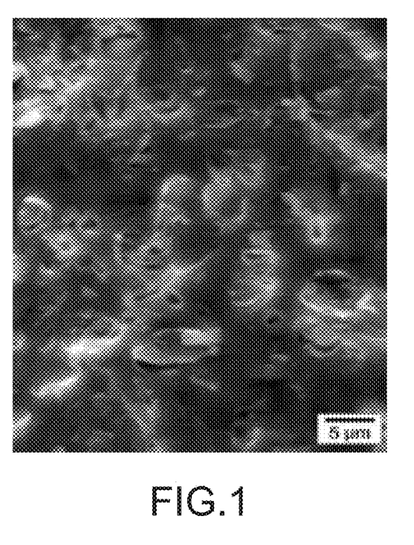
FIGS. 1 to 3 represent photographs taken with an electron microscope of three examples of materials prepared according to an embodiment of the invention discussed in Example 1.
Figure 2:
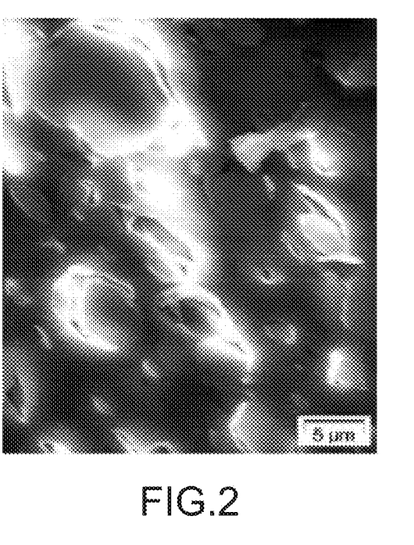
Figure 3:
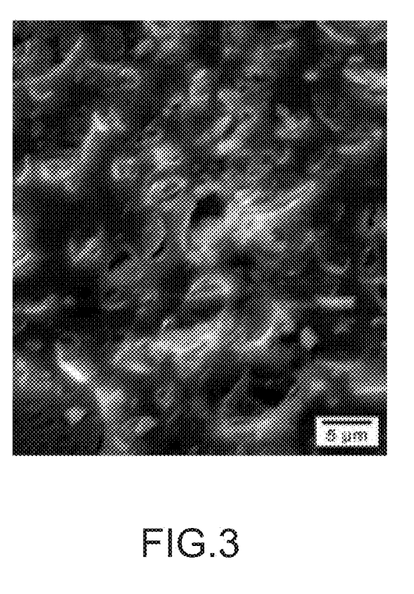
Figure 4:
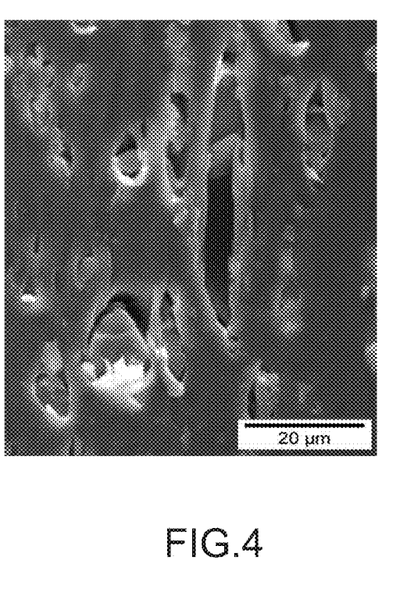
FIG. 4 illustrates a photograph taken with an electron microscope of a material non-compliant with the invention, the preparation of which is discussed in example 1.

As regards FIGS. 1 to 3, it is clearly apparent that the inorganic particles forming the functional inorganic phase are organized in micro-domains. As for FIG. 4, it appears that these particles are organized in macro-domains.

Example 2

This example illustrates the preparation of materials according to the invention on operating bases similar to those of Example 1 except that the polymeric matrix exclusively consists of a PVDF-HFP-ADX copolymer prepared by transformation of a PVDF-HFP copolymer with a determined maleic anhydride mass proportion. Three tests were contemplated with respectively a PVDF-HFP-ADX copolymer prepared with 0.15% by mass of maleic anhydride (test 4), a PVDF-HFP-ADX copolymer prepared with 0.24% by mass of maleic anhydride (test 5) and a PVDF-HFP-ADX copolymer prepared with 0.75% by mass of maleic anhydride (test 6).

The operating conditions of the prehydrolysis step for the different tests applied are stated in the table below (with x=y).

| Test | A (in g) | B (in g) | x and y (in g) |
|---|---|---|---|
| 4 | 9.52 | 1.61 | 1.35 |
| 5 | 9.52 | 1.61 | 1.35 |
| 6 | 9.52 | 1.61 | 1.35 |

The different hydrolyzates obtained from these tests are then applied in order to form, according to the process of the invention, composite materials including inorganic particles functionalized and compatibilized with the matrix.

The table below groups the different proportions (in percent by mass based on the total mass of the mixture} of mercaptopropyltriethylsilane (below said to be the compound —SH), of dimethoxysilane (below is said to be the precondensate) and the PVDF-HFP-ADX copolymer applied for the different tests.

| Test | PVDF-HFP-ADX | | Compound —SH | | Precondensate | |
|---|---|---|---|---|---|---|
| | m (g) | % m | m (g) | % (m) | m (g) | % m |
| 4 | 12 | 51.88 | 9.52 | 41.16 | 1.61 | 6.96 |
| 5 | 12 | 51.88 | 9.52 | 41.16 | 1.61 | 6.96 |
| 6 | 12 | 51.88 | 9.52 | 41.6 | 1.61 | 6.96 |

The table below groups the characteristics of the material in terms of mass percentages of —SH function, of functional inorganic particles as mentioned above, and non-functional silica particles.

|  | Function —SH | | Non-functional inorganic particles | | Functional inorganic particles | |
| --- | --- | --- | --- | --- | --- | --- |
| Test | m (in g) | % m | m (en g) | % m | m (in g) | % m |
| 4 | 5.07 | 28.20 | 2.99 | 16.61 | 5.98 | 33.26 |
| 5 | 5.07 | 28.20 | 2.99 | 16.61 | 5.98 | 33.26 |
| 6 | 5.07 | 28.20 | 2.99 | 16.61 | 5.98 | 33.26 |

Figure 5:
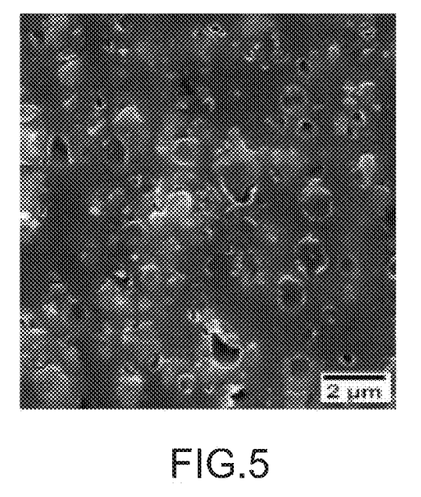
FIGS. 5 to 7 illustrate photographs taken with electron microscopy of three exemplary materials prepared according to the operating procedure discussed in example 2.
Figure 6:
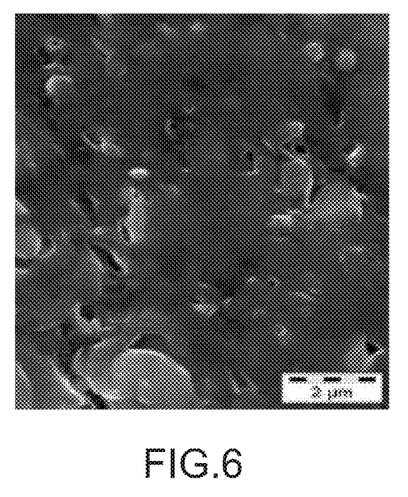
Figure 7:
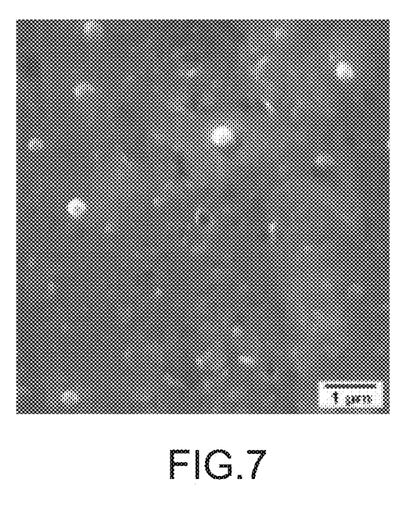

FIGS. 5 to 7 enclosed as an annex illustrate photographs of materials respectively obtained in tests 4 to 6, from which it clearly emerges that the inorganic particles forming the functional inorganic phase are organized as microdomains, the morphology being all the finer since the maleic anhydride levels are high.

Example 3

In order to test the possibility of applying the materials obtained according to the process of the invention as a fuel cell membrane, it was proceeded with chemical transformation of the functions —SH and —SO$_3$H with the aforementioned materials of tests 4 to 6.

In order to do this, these materials are treated by immersion in an oxidizing solution of hydrogen peroxide H$_2$O$_2$ at 50% by mass for 7 days at room temperature.

After 7 days of stirring, the materials are rinsed 3 times with permuted water and it is then proceeded with a fourth rinse for 24 hours, in order to remove the remainder of hydrogen peroxide and any forms of impurities.

The number of proton conducting sites is then determined further called ion exchange capacity (known under the acronym of IEC) by direct acid-base dosage. To do this, the materials are immersed in a 2M NaCl solution for 24 hours for total exchange of protons from the groups —SO$_3$H. The thereby obtained materials are then dried in vacuo for 24 hours at 60° C. before determining the dry mass thereof (said to be M$_{samp}$).

The protons released of the solution are dosed by colorimetry (by using phenolphtalein) with a titrating solution of 0.05 M NaOH.

The IEC is then determined with the following formula:

$$\text{IEC (in mequiv} \cdot \text{g}^{-1}) = (1000 * C_{NaOH} * V_{NaOH})/M_{samp}$$

wherein:

C$_{NaOH}$ corresponds to the concentration of the soda solution;
V$_{NaOH}$ corresponds to the volume of NaOH at equivalence; and
M$_{samp}$ corresponds to the dry mass of the material.

The ion exchange capacities obtained with the different materials tested appear in the table below.

| Material | IEC |
| --- | --- |
| Material from test 4 | 1.07 |
| Material from test 5 | 0.82 |
| Material from test 6 | 0.98 |

The aforementioned materials all have a large ion exchange capacity, the values of which are of the same order of magnitude as those of Nafion®.

Furthermore, the morphology attained with the use of compatibilizing agents according to the definition of the invention gives the possibility of obtaining a percolated network of proton-conducting inorganic particles within the polymeric matrix.

The invention claimed is:

1. A process for preparing a composite material comprising a fluorinated polymeric matrix and a filler consisting of ion exchange inorganic particles comprising a step for synthesizing in situ said particles within the polymeric matrix, said matrix comprising at least one first copolymer consisting of a copolymer comprising at least two types of fluorinated recurrent units, one type of which bears at least one pendant maleic anhydride group.

2. The process according to claim 1, wherein the in situ synthesis step is carried out in an extruder.

3. The process according to claim 1, wherein the in situ synthesis step is carried out with a sol-gel method.

4. The process according to claim 1, wherein the in situ synthesis step is carried out with a sol-gel method comprising the following operations:

an operation for putting the first copolymer and if necessary the constitutive distinct (co)polymer(s) of the matrix, in contact with one or several precursors of the inorganic particles, said precursor(s) fitting the following formula (I):

$$(X)_{y-n}\text{-M-}(R)_n \quad (I)$$

wherein:
M is a metal element or a metalloid element;
X is a hydrolyzable chemical group;
R is an ion exchange chemical group or a precursor group of an ion exchange chemical group;
y corresponds to the valency of the element M; and
n is an integer ranging from 0 to (y−1);

a hydrolysis-condensation operation of said precursor(s), in return for which inorganic particles are obtained, resulting from the hydrolysis-condensation of said precursors;

in the case when R is a precursor group of an ion exchange chemical group, an operation for transforming the precursor group into an ion exchange chemical group or, in the case when n=0, an operation for functionalizing said particles with ion exchange chemical groups.

5. The process according to claim 1, wherein the in situ synthesis step is carried out with a sol-gel method comprising the following steps:

an operation for hydrolysis of one or several precursors of inorganic particles of the following formula (I):

$$(X)_{y-n}\text{-M-}(R)_n \quad (I)$$

wherein:
M is a metal element or a metalloid element;
X is a hydrolyzable chemical group;
R is an ion exchange chemical group or a precursor group of an ion exchange chemical group;
y corresponds to the valency of element M; and
n is an integer ranging from 0 to (y−1);

an operation for putting the hydrolyzate obtained in the preceding step in contact with the first copolymer and if necessary the distinct (co)polymer(s) entering the composition of the matrix;

an operation for heating the resulting mixture to an effective temperature for generating transformation of the hydrolyzate into inorganic particles;

in the case when R is a precursor group of an ion exchange chemical group, an operation for transforming the precursor group into an ion exchange chemical group or, in the case when n=0, an operation for functionalizing said particles with ion exchange chemical groups.

6. The process according to claim 4, wherein M is silicon, titanium, aluminium, germanium, tin or lead.

7. The process according to claim 4, wherein X is an —OR' group or a halogen atom, R' representing an alkyl group.

8. The process according to claim 4, wherein R is a cation exchange group of formula —$R^2$—$Z^1$, wherein:
$R^2$ is a simple bond, a linear or branched alkylene group, and optionally for which one or several hydrogen atoms are substituted with a halogen atom, such as fluorine, or $R^2$ is a cyclic hydrocarbon group;
$Z^1$ is a group —$SO_3H$, —$PO_3H_2$, —$CO_2H$, optionally as salts.

9. The process according to claim 4, wherein R is a group of formula —$R^2$—$Z^3$, wherein:
$R^2$ is a simple bond, a linear or branched alkylene group, and optionally for which one or several hydrogen atoms are substituted with a halogen atom, such as fluorine, or $R^2$ is a cyclic hydrocarbon group;
$Z^3$ is a precursor group of a group $Z^1$ wherein $Z^1$ is a group —$SO_3H$, —$PO_3H_2$, —$CO_2H$, optionally as salts.

10. The process according to claim 9, wherein the precursor is a precursor of the following formula (II):

(II)

wherein:
R' is an alkyl group;
R corresponds to the formula —$R^2$—$Z^3$, $R^2$ being a linear or branched alkylene group, comprising from 1 to 30 carbon atoms, and optionally for which one or several hydrogen atoms are substituted with a halogen atom, such as fluorine and $Z^3$ is a precursor group of a group $Z^1$ wherein $Z^1$ is a group —$SO_3H$, —$PO_3H_2$, —$CO_2H$, optionally as salts;
n is an integer ranging from 1 to 3.

11. The process according to claim 10, wherein the precursor is mercaptopropyltriethoxysilane of formula:

12. The process according to claim 4, wherein the precursor(s) are used in combination with a precondensate comprising recurrent units of the following formula (III):

(III)

wherein:
M is a metal or metalloid element;
X is a hydrolyzable chemical group;
y corresponds to the valency of element M.

13. The process according to claim 1, wherein the matrix exclusively consists of said first copolymer.

14. The process according to claim 1, wherein the matrix comprises, in addition to said first copolymer, at least one other (co)polymer distinct from said first copolymer.

15. The process according to claim 14, wherein the distinct (co)polymer is selected from among fluorinated thermoplastic polymers.

16. The process according to claim 15, wherein the fluorinated thermoplastic polymers are not ion exchange polymers, said fluorinated thermoplastic polymers selected from among polytetrafluoroethylenes (PTFE), poly(vinylidene fluoride)s (PVDF), fluorinated ethylene-propylene copolymers (FEP), copolymers of ethylene and tetrafluoroethylene (ETFE), copolymers of vinylidene fluoride and hexafluoropropene (PVDF-HFP) and mixtures thereof.

17. The process according to claim 1, wherein the first copolymer consists in a copolymer comprising, in addition to the fluorinated recurrent unit bearing the pendant maleic anhydride group, a recurrent unit fitting the following formula (V):

wherein $R^3$, $R^4$, $R^5$ and $R^6$ represent, independently of each other, a hydrogen atom, a halogen atom, a perfluoroalkyl group or a perfluoroalkoxy group, provided that at least one of the groups $R^3$ to $R^6$ represents a fluorine atom, a perfluoroalky group or a perfluoroalkoxy group.

18. The process according to claim 17, wherein a particular recurrent unit covered by the general definition of recurrent units of formula (V) corresponds to a recurrent unit of the following formula (VII):

19. The process according to claim 1, wherein the first copolymer further comprises a recurrent unit of the following formula (IX):

20. The process according to claim 1, wherein the fluorinated recurrent unit comprising a pendant maleic anhydride group is a recurrent unit of the following formula (X):

wherein $R^7$ to $R^9$ represent, independently of each other, a hydrogen atom, a halogen atom, a perfluoroalkyl group.

21. The process according to claim 20, wherein a particular recurrent unit covered by the general definition of recurrent units of formula (X) corresponds to a recurrent unit of the following formula (XI):

22. The process according to claim 1, wherein the first copolymer is a copolymer comprising a first type of recurrent unit of formula (VII)

a second type of recurrent unit of formula (IX)

and a third type of recurrent unit of formula (XI)

23. The process according to claim 1, wherein the first copolymer comprises, except for the fluorinated recurrent units comprising a pendant maleic anhydride group, one or several recurrent units with formula(e) identical with that (those), if necessary, of the distinct (co)polymers entering the composition of the fluorinated polymer matrix.

24. A composite material comprising a fluorinated polymeric matrix comprises at least one first copolymer consisting of a copolymer comprising at least two types of fluorinated recurrent units, one type of which bears at least one pendant maleic anhydride group, and a filler consisting of ion exchange inorganic particles.

25. An electrolytic membrane for a fuel cell comprising a material as defined in claim 24.

* * * * *